May 25, 1937. H. C. BEHRENS 2,081,846
LOCOMOTIVE GEAR TRANSMISSION
Filed Nov. 14, 1934 4 Sheets-Sheet 1

INVENTOR
Herbert C. Behrens
BY
ATTORNEY

May 25, 1937.  H. C. BEHRENS  2,081,846
LOCOMOTIVE GEAR TRANSMISSION
Filed Nov. 14, 1934  4 Sheets-Sheet 3

INVENTOR
Herbert C. Behrens
BY
ATTORNEY

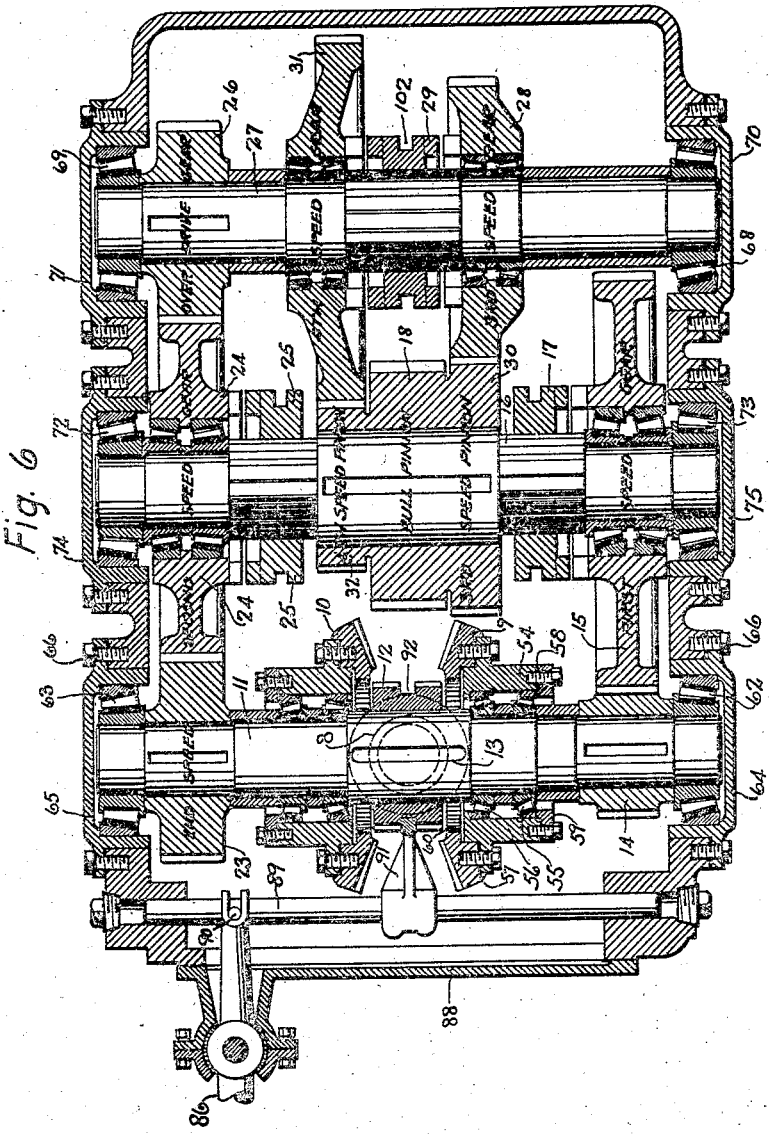

Patented May 25, 1937

2,081,846

UNITED STATES PATENT OFFICE 2,081,846

LOCOMOTIVE GEAR TRANSMISSION

Herbert C. Behrens, Woodlyn, Pa.

Application November 14, 1934, Serial No. 753,015

8 Claims. (Cl. 74—327)

This invention relates generally to an improved gear transmission and more particularly to an improved constant mesh transverse type locomotive transmission.

Usual types of change speed gear transmissions for internal combustion engine driven locomotives have certain deficiencies in that they are excessively large, cumbersome in operation and high in manufacturing cost. It is an object of my present invention to provide an improved transmission that overcomes the foregoing objections and hence is particularly adapted for use in locomotives. Further and more specific objects are to utilize, in combination with my improved arrangement, forward and reverse bevel gears placed directly at power input so as to maintain a constant peripheral speed of said bevel gears regardless of the gear in which the transmission may be operating or the gear ratio; to obtain a complete and convenient adjustment between the bevel driving pinion and the two bevel driven gears with which said pinion constantly meshes; to obtain a wide series of reduction ratios by an improved arrangement permitting various bevel gear combinations or sprocket combinations to be inserted without the necessity of completely dismantling the transmission case or of disturbing the change speed gear or shifting gear combinations; to reduce the peripheral speed of all change speed gear trains to allow an easier entrance in the engaging or shifting of the shifting gears or shifting clutches whichever may be employed; to reduce the peripheral speed of all gears in the transmission so as to allow more quiet operation, increased efficiency and better lubrication by the absence of any whipping, churning or aerating of the lubricant used in the transmission and thereby lessen the high temperature rise which is encountered in conventional designs of transmissions due to high peripheral speed and increased friction caused by aerated lubricant; to place the gear assemblies in a transverse position to the locomotive and thereby secure a gear train rotation in line with the travel of the locomotive; and to obtain a more compact unit together with simplified machining and manufacturing operations.

Other objects and advantages will be more apparent to those skilled in the art from the following description of the accompanying drawings in which:

Fig. 6 is a sectional view taken substantially on the angular line 6—6 of Fig. 4 and developed on to a plane.

In the illustrated embodiment of the invention which is shown herein merely for the purpose of disclosing one specific form among possible others that the invention might take in practice, I have provided four speeds forward and reverse together with certain novel features of construction and arrangement of parts which will be better understood by first tracing the various gear trains without reference to details of construction.

Figure 4:
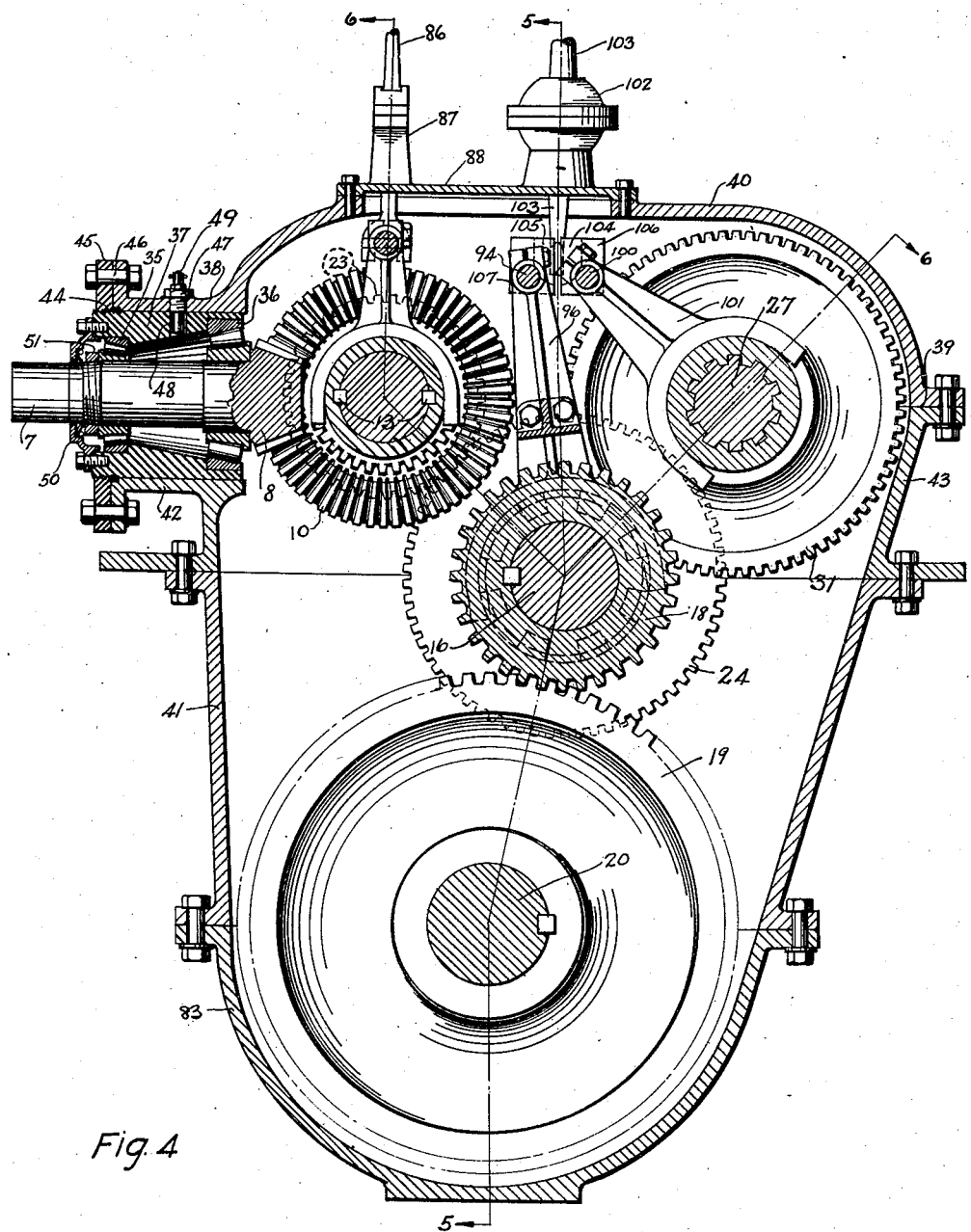
Fig. 4 is a vertical longitudinal section taken substantially on the line 4—4 of Fig. 2.
Figure 5:
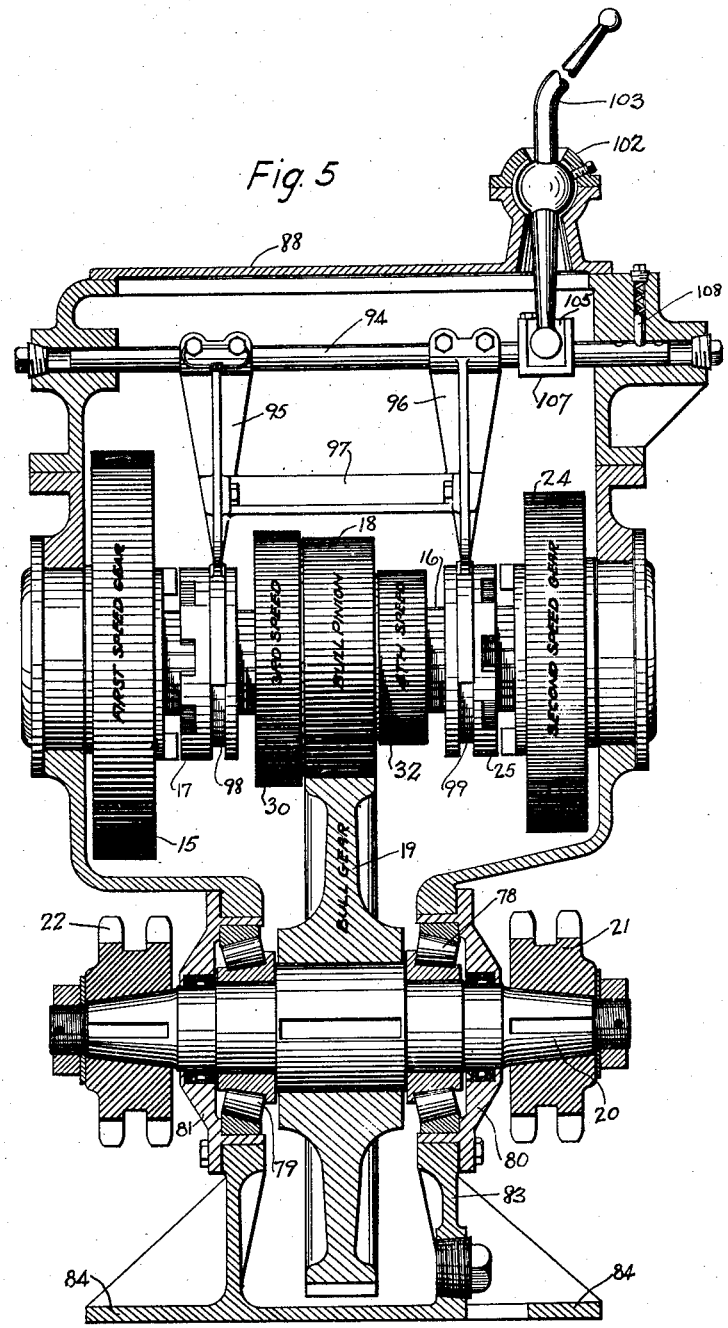
Fig. 5 is a vertical transverse section taken substantially on the line 5—5 of Fig. 4.

*First speed—Forward.*—Power from any suitable source such as an internal combustion engine is transmitted as shown in Figs. 4 and 6 through a longitudinal driving shaft 7 to a bevel pinion 8 which is in constant mesh with a forward bevel gear 9 and a reverse bevel gear 10, these gears being idly journalled on a transverse bevel gear shaft 11 hereinafter also referred to as the power input shaft. Assuming that the forward bevel gear 9 is to drive, then a clutch element 12 slidably keyed as at 13 to shaft 11, is shifted to connect shaft 11 with pinion 9 whereupon power is transmitted through gear 9, shaft 11, a pinion 14 keyed to shaft 11, and a gear 15 which is normally idly journalled on a transverse shaft 16 but adapted to be connected thereto by a shiftable clutch element 17. Rotation of shaft 16 drives a gear cluster including a bull pinion 18. As shown in Figs. 4 and 5, this pinion is in constant mesh with a bull gear 19 which is keyed to a transverse power take-off or driven shaft 20 specifically shown as having two sprockets 21 and 22 to transmit power to a locomotive axle through chains, although it will of course be understood that shaft 20 may be connected in any other desired manner with any element to be ultimately driven although the present arrangement is peculiarly adapted for the sprocket drive as shown.

*Second speed—Forward.*—Power is transmitted through bevel pinion 8 to bevel gear 9, clutch 12, shaft 11, a gear 23 keyed to shaft 11 and a gear 24 which is normally idly journalled on shaft 16 but adapted to be connected thereto by a shiftable clutch element 25 (clutch element 17 having been disconnected from gear 15) to drive shaft 16 and bull pinion 18 and thus rotate bull gear 19 and shaft 20 at a slightly greater speed than for first speed.

*Third speed—Forward.*—Power is transmitted from bevel pinion 8 through bevel gear 9 and shaft 11 to gear 23 and gear 24 which is now unclutched from shaft 16, thence through a gear 26 keyed to an intermediate transverse shaft 27 that is connected to a gear 28 by a shiftable clutch element 29, the gear 28 meshing with a pinion 30 of the gear cluster to drive bull pinion 18 and bull gear 19 and shaft 20 at a still greater speed than for first and second speed.

*Fourth speed—Forward.*—Power is transmitted from a bevel pinion 8 to bevel gear 9 and thence through shaft 11, gears 23, 24 and 26 and shaft 27 which is connected to a gear 31 by a shiftable clutch element 29. Gear 31 meshes with a pinion 32 of the gear cluster to drive bull pinion 18 and bull gear 19 together with sprocket shaft 20 at the highest speed.

*Reverse.*—All of the foregoing gear trains may be driven in a reserve direction by connecting clutch element 12 with bevel gear 10 whereupon shaft 11 and the various gear trains are driven in the reverse direction.

*Structure.*—To suitably journal or support various of the foregoing elements and to shift the clutches so as to obtain coordinated operation thereof and to permit various of the beforementioned results to be accomplished, I have provided several novel features. It will be noted that shaft 7 is journalled preferably in tapered roller bearings 35 and 36 which are supported in an axially movable sleeve 37, this sleeve in turn being supported in a bearing housing 38 split along a plane indicated at 39 in Fig. 4 whereby the upper half of bearing housing 38 is formed in an upper section 40 of a gear case generally indicated at 41 and the lower half 42 of the bearing housing is formed as part of an intermediate section 43. Sleeve 37 has its outer end threaded as at 44 to receive a flange nut 45. This nut being in the nature of an annular flange is adapted to be screwed to bearing housing 38 by bolts 46. A stud 47 is threaded into bearing housing 38 and enters a suitable size recess or opening 48 in bearing sleeve 37. If desired, a suitable lubricating fixture 49 may be mounted in stud 47 to supply lubricant or grease to the roller bearings. Also a usual bearing cap or grease retainer 50 is removably secured to sleeve 37 by screws or other suitable means.

As a result of the foregoing construction, I am able to effect adjustment of bevel pinion 8 with respect to the bevel gears 9 and 10. For instance, to move pinion 8 inwardly, bolts 46 are first removed and flange nut 45 is screwed outwardly on sleeve 37 to the desired extent of adjustment whereby upon replacing and tightening bolts 46, flange nut 45 is drawn against the flange of bearing housing 38 and at the same time sleeve 37, shaft 7 and pinion 8 are shifted inwardly. On the other hand, to adjust pinion 8 outwardly, flange nut 45 is screwed inwardly on sleeve 37 so as to move the same in an outward direction, bolts 45 being initially removed and then replaced. It will of course be understood that bearings 35 and 36 and shaft 7 have a fixed axial relation to each other as may be accomplished in any usual manner including if desired a nut 51.

Bevel gear 9 is supported on a bearing sleeve 54 in turn preferably journalled on a pair of roller bearings 55 and 56 which are mounted on shaft 11. A shim 57 interposed between gear 9 and a suitable holding flange of sleeve 54 permits independent axial adjustment of the gear if desired while a shim 58 interposed between the end of sleeve 54 and a bearing cover 59 permits adjustment of the tapered roller bearings 55 and 56. Bevel gear 9 is provided with internal clutch teeth 60 for engagement with complementary teeth of clutch 12, the clutch teeth being specifically in the form of gear teeth. A similar construction is employed with bevel gear 10 and its bearing arrangement, and hence the same need not be further described. Such a complementary internal and external gear tooth clutch may be used if desired for the other clutches herein described.

Shaft 11 is journalled at its ends in suitable bearings specifically shown as tapered roller bearings 62 and 63 which in turn are supported within bearing caps 64 and 65. These caps are received in suitable openings formed in adjacent sides of gear case sections 40 and 43 divided at the plane 39 as previously mentioned. Bolts 66 secure the bearing caps firmly in position to each of the gear case sections.

Shaft 27 is similarly journalled in bearings 68 and 69. These bearings are also supported in bearing caps 70 and 71 which are received within openings in the gear case disposed in openings formed between the gear case sections 40 and 43 along the plane 39.

The transverse bull pinion shaft 16 is similarly journalled in bearings 72 and 73 which are supported in bearing caps 74 and 75. These caps, however, are received in openings formed between gear case section 43 and a lower gear case section 76, the bearing openings being split along a plane indicated at 77. The caps in all instances are held to the gear case by screw bolts such as 66.

The sprocket shaft 20 as shown in Fig. 5 is journalled in bearings 78 and 79, these bearings being supported in bearing caps 80 and 81 disposed within suitable casing openings formed between gear case section 76 and a lowermost case section 83. This lower case section is relatively narrow and is provided with flanges 84 to support the transmission on a locomotive bed or frame or other desired member.

As seen in the vertical cross-section of Fig. 4, the three transverse speed reducing shafts 11, 16 and 27 are arranged in triangular form and are all disposed above the power take-off shaft 20, these two features being highly conducive to a compact and rigid transmission without any sacrifice of operating efficiency.

*The shifting mechanism* for the various clutch elements includes as shown in Figs. 4 and 6 a lever 86 pivotally supported in a suitable bracket 87 and extending into the gear case through a suitable cover 88. The forked end of the lever straddles a shaft 89 and engages a pin 90 extending transversely thereof as shown more fully in the developed view of Fig. 6. Rod 89 has an arm 91 secured thereto and riding in a groove 92 of clutch 12. Hence by shifting lever 86 in a single plane, clutch 12 may connect shaft 11 to either one of bevel gears 9 or 10.

To shift clutches 17 and 25 and to retain the same in a fixed axial relation so that both may be in a neutral position or one or the other engaged with gear 15 or 24, I provide as shown in Figs. 4 and 5 a shaft 94 suitably supported in the gear case. This shaft has secured thereto a pair of arms 95 and 96 which are further held in fixed relation by a cross member 97. The inner ends of arms 95 and 96 have usual shifter fingers in grooves 98 and 99 of clutches 17 and 25 respectively. Another shifting shaft 100 as shown in Fig. 4 has secured thereto a shifter arm 101 whose yoke end rides in a groove 102 of clutch 29. Shaft 100 is supported in the gear case for axial movement in relatively close position to shaft 94 whereby each shaft may be selectively actuated by any suitable common shifting lever 103 and usual cooperating elements. One specific form of such elements, among possible others that might be employed, consists in having lever 103 supported in a ball and socket joint 102 whereby the lower end of lever 103 may be moved laterally into one or the other of suitable complementary recesses 104 or 105 formed in shifting blocks 106 and 107 which are secured to shafts 100 and 94 respectively. The clutch arms 101 and 96 must be in their neutral position in order to permit the lower end 103 of the shifting lever to be selectively disposed in one or the other of recesses 104 or 105. After either block 106 or 107 is shifted from its neutral position, its recess will be out of register with the recess of the other block, thus preventing lever 103 from operating the other clutch elements. While one specific form of selective gear shift has been thus disclosed, it will of course be understood that any other conventional gear shift may be employed. Any suitable detent mechanism generally indicated at 108, Fig. 5, may be employed to maintain the clutch shifting shafts in their various positions.

Figure 1:
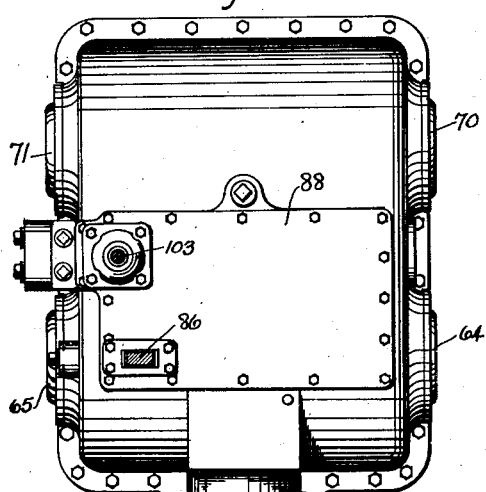
Fig. 1 is a plan view of a transmission casing.
Figure 3:
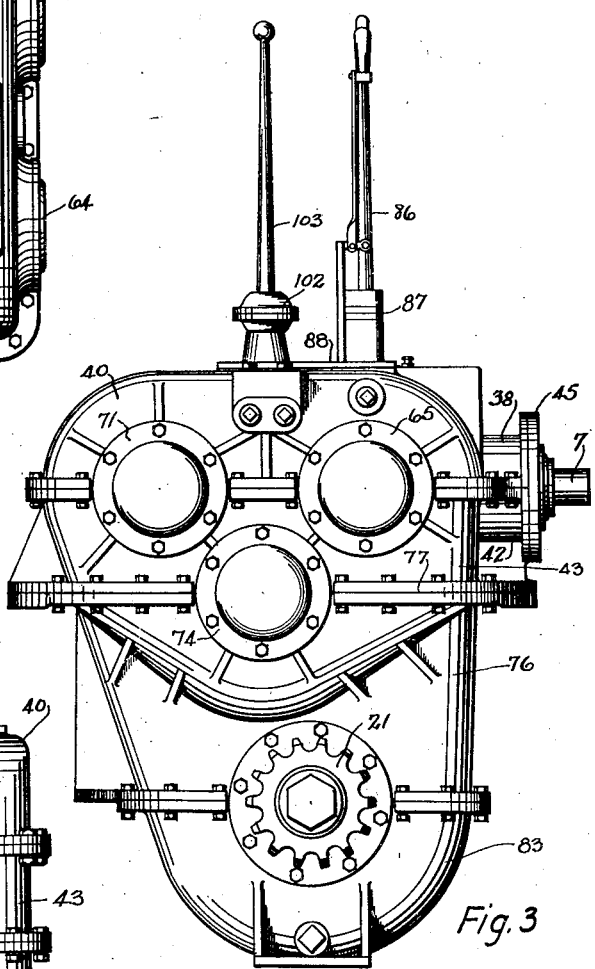
Fig. 3 is a side view of the casing looking in the direction of the arrow 3 in Fig. 2.
Figure 2:
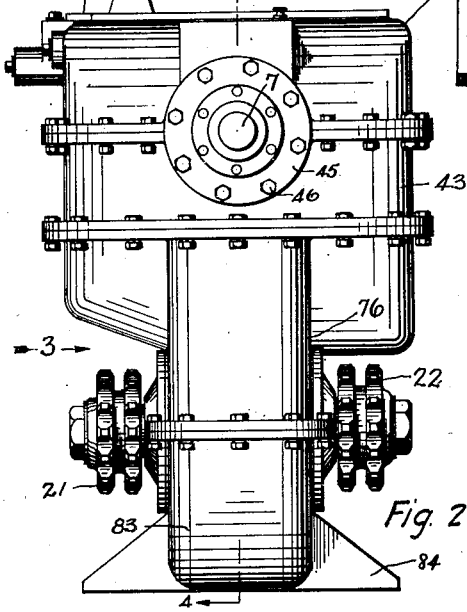
Fig. 2 is a front view of the casing looking in the direction of the arrow 2 in Fig. 1.

From the foregoing disclosure it is seen that I have provided a constant mesh transverse transmission that is especially adapted for application to internal combustion engine locomotives and that my improved transmission permits effective adjustment for the various parts and various reduction ratios to be made by inserting different bevel gear combinations or sprocket combinations in the gear case without the necessity of completely dismantling the same or of disturbing the shifting gear combinations. Also as a result of reducing the peripheral speed of all change speed gear trains, easier entrance in the engaging and shifting of the clutches is permitted and as a further result of the reduced peripheral speed, better lubrication is effected due to the absence of whipping, churning or aerating of the lubricant. By placing the gear assemblies in a transverse position to the locomotive, I am able to secure a gear train rotation in line with the travel of the locomotive and to obtain a more compact unit together with its simplified machining and assembling operations. Also the transmission case with its multiple sections assumes an approximate cubical likeness and shape thereby imparting a high degree of strength and rigidity as is particularly apparent from the exterior views shown in Figs. 1 to 3.

All of the foregoing features result in a transmission of comparative simplicity, strength and effectiveness of operation and have materially reduced the cost of manufacture over that of other types of transmission used under similar circumstances in internal combustion engine locomotives where severe service conditions demand the utmost strength and durability. Compactness is also obtained as it not only contributes to cheapness but to saving of weight of the locomotive and space therein.

It will of course be understood that various changes in details of construction and arrangement of parts may be made by those skilled in the art without departing from the spirit of the invention as set forth in the appended claims.

I claim:

1. A change speed gear transmission comprising, in combination, a gear case, a longitudinal driving shaft having a bevel pinion, a transverse shaft having idly journalled thereon a pair of opposed bevel gears constantly meshing with said pinion, a clutch for alternatively connecting said bevel gears to its shaft, a transverse shaft having a bull pinion, a gear secured to said bevel gear shaft, a gear idly journalled on said bull pinion shaft and meshing with said latter gear, a clutch operable in either direction of rotation for connecting said bull pinion shaft to said gear which is idly journalled thereon, and a power take-off shaft having a bull gear meshing with said bull pinion.

2. A change speed gear transmission comprising, in combination, a gear case, a longitudinal driving shaft having a bevel pinion, a transverse shaft having idly journalled thereon a pair of opposed bevel gears constantly meshing with said pinion, a clutch for alternatively connecting said bevel gears to its shaft, a transverse shaft having a bull pinion, a gear secured to said bevel gear shaft, a gear idly journalled on said bull pinion shaft and meshing with said latter gear, a clutch for connecting said bull pinion shaft to the gear which is idly journalled thereon, a power take-off shaft having a bull gear meshing with said bull pinion, a third transverse shaft provided with a gear meshing with said idly journalled gear on the bull pinion shaft and also provided with an idly journalled gear meshing with another gear on the bull pinion shaft, and a clutch adapted to connect said third transverse shaft to the gear idly journalled thereon.

3. A speed change gear transmission comprising a gear case, a plurality of parallel shafts one of which receives power input and another of which has a bull pinion, a pair of gears secured to said power input shaft, a pair of gears respectively meshing therewith and idly journalled on said bull pinion shaft, a pair of clutches associated with said bull pinion shaft and maintained in fixed axial relation with respect to each other whereby both of said clutches may be simultaneously placed in a neutral position or they may alternatively connect the bull pinion shaft to one or the other of the gears idly journalled thereon, an intermediate shaft disposed parallel to said bull pinion and power input shafts, a gear secured to said intermediate shaft and constantly meshing with one of the idly journalled gears on the bull pinion shaft, a gear cluster associated with the bull pinion on its shaft including a pair of speed reducing gears, a pair of gears idly journalled on said intermediate shaft constantly meshing with said reducing gears of the gear cluster, and clutch mechanism adapted to alternatively connect said intermediate shaft to one or the other of the gears idly journalled thereon.

4. A speed change gear transmission comprising, in combination, a gear case, a longitudinal driving shaft having a bevel pinion, a transverse shaft having a bevel gear driven by said pinion, another transverse shaft having a bull pinion, gearing for directly driving said bull pinion shaft from said bevel gear shaft, a third transverse shaft, means for transmitting power through said gearing to said third shaft, and means for driving said bull pinion shaft from said third shaft.

5. A change speed gear transmission comprising, in combination, a gear case, a longitudinal driving shaft having a bevel pinion, a bevel gear shaft driven by said pinion, a bull pinion and shaft therefor, an idler gear on said bull pinion shaft driven by said bevel gear shaft, a third shaft having a gear meshing with said idler gear, and another gear on said third shaft for driving said bull pinion shaft.

6. A change speed gear transmission comprising, in combination, a gear case, a longitudinal driving shaft having a bevel pinion, a bevel gear shaft driven by said pinion, a bull pinion and shaft therefor, an idler gear on said bull pinion shaft driven by said bevel gear shaft, a third shaft having a gear meshing with said idler gear, and a pair of other gears on said third shaft adapted to alternatively drive said bull pinion shaft.

7. A change speed gear transmission comprising, in combination, a gear case, a longitudinal driving shaft having a bevel pinion, a transverse bevel gear shaft driven by said pinion, a transverse bull pinion shaft, means for driving said bull pinion shaft directly from said bevel gear shaft for first speed operation, means for driving said bull pinion shaft directly from said bevel gear shaft for second speed operation, a transverse intermediate shaft, means for driving said intermediate shaft from said bevel gear shaft, and a plurality of sets of cooperating gears of different gear ratios for driving said bull pinion shaft by said intermediate shaft.

8. The combination set forth in claim 7 further characterized in that said plurality of sets of cooperating gears includes a plurality of gears idly journalled on said intermediate shaft and means for selectively connecting any one of said idly journalled gears to said intermediate shaft for effecting said different speed ratios.

HERBERT C. BEHRENS.